July 11, 1961   E. J. COLE ET AL   2,991,973
COOLING OF BODIES SUBJECT TO A HOT GAS STREAM
Filed Sept. 16, 1955   2 Sheets-Sheet 1

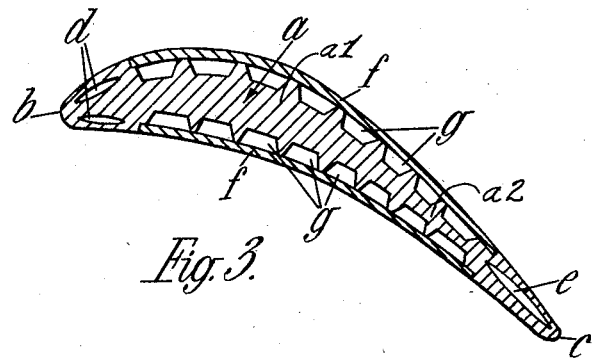
Fig. 3.
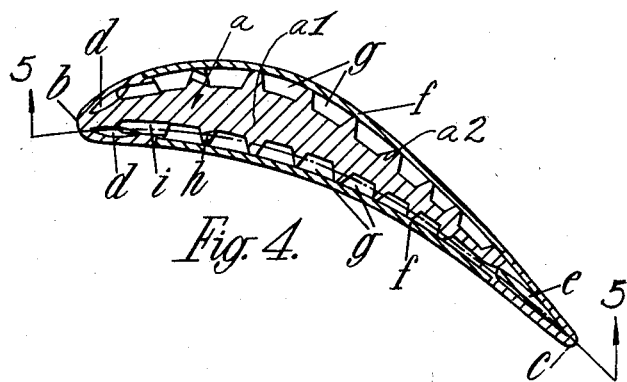
Fig. 4.
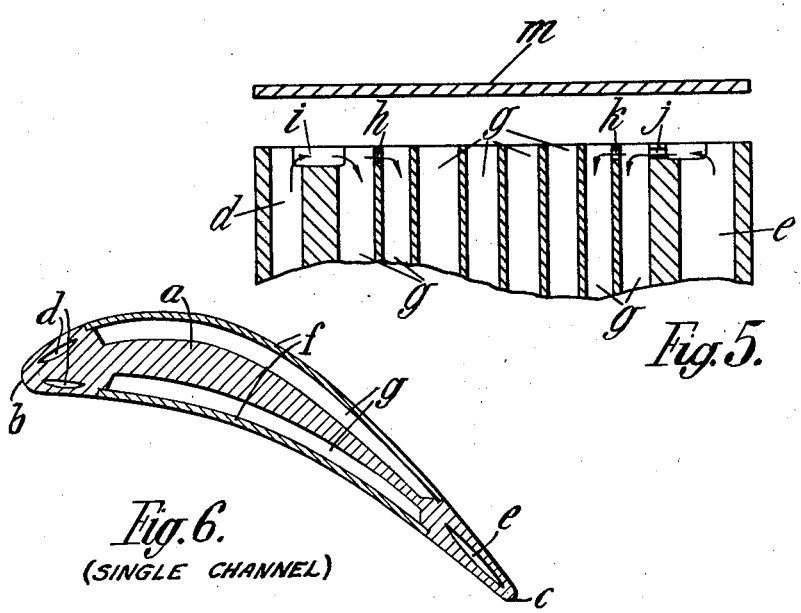
Fig. 5.
Fig. 6.
(SINGLE CHANNEL)

United States Patent Office 2,991,973
Patented July 11, 1961

2,991,973
COOLING OF BODIES SUBJECT TO A HOT GAS STREAM
Ernest John Cole, Newcastle-upon-Tyne, Vincent Walker, Monkseaton, and Jack Donald Wells, Tynemouth, England, assignors to The Parsons and Marine Engineering Turbine Research and Development Association, Wallsend, England
Filed Sept. 16, 1955, Ser. No. 534,856
Claims priority, application Great Britain Oct. 18, 1954
8 Claims. (Cl. 253—39.15)

This invention relates to the cooling of members which are exposed to a hot gas stream and is particularly, though not exclusively, applicable to the cooling of turbine blades.

With pure effusion cooling of a turbine blade the peaks of static pressure and considerable variations of heat transfer coefficient, which occur at the leading edge region and which vary with the angle of incidence of the hot gas make uniform cooling of this region very difficult to achieve. At the trailing edge, pressure and heat transfer conditions are less severe but the manufacture of a thin porous trailing edge of sufficient strength presents considerable difficulty.

Pure internal cooling of a turbine blade on the other hand is relatively inefficient since the surface area of the internal cooling passages must always be smaller than that of a porous material, hence the coolant is discharged at a relatively low temperature. There is also the absence of the film of cool air or other coolant which provides an insulating effect in the case of effusion cooling.

The invention consists in a turbine blade or other member subject to exposure to a hot gas stream furnished with means, including an external covering of porous material, for cooling it by effusion and also means, including internal cooling passages, for cooling it internally.

The invention also consists in a member as set forth in the preceding paragraph, comprising an extruded, or otherwise manufactured, spine or core integral with the leading and trailing edge portions having at least one internal cooling passage formed therein and sheet porous material covering the external surfaces between the leading and trailing edge portions and attached by sintering, electric welding or other convenient means, channels being formed between the porous surface and the central spine or core through which the cooling medium is supplied to cool the surface of the member.

The invention also consists in a member as set forth in the preceding paragraph wherein air in each channel is metered according to the individual conditions of pressure and heat transfer existing on the external surface of the member at the various positions.

The invention also consists in a member as set forth in the preceding paragraph wherein orifices are provided at the root of each channel.

The invention also consists in a member as set forth in the first of the two preceding paragraphs wherein variations are made in the permeability of thickness of the porous material, separate channels being unnecessary unless required for mechanical strength.

The invention also consists in a member as set forth in any of the four preceding paragraphs wherein air exhausted at the top of the member from the internal cooling passages is fed back into the cooling channels between the porous wall and the spine or core, by means of a suitable plate.

Several forms of the invention are illustrated by way of example in the accompanying drawings, in which:

FIGURE 3 is a view similar to FIGURE 2, of a further form of the invention;

FIGURE 4 is a view similar to FIGURES 2 and 3, being yet another embodiment of the invention;

FIGURE 5 is a sectional view taken along the line 5—5 of FIGURE 4, the view looking in the direction of the arrows; and, FIGURE 6 is a view generally similar to FIGURE 1, showing a further form of the invention.

In carrying the invention into effect according to one convenient example as applied to a turbine blade, an extruded or otherwise manufactured spine or core $a$ having integral leading and trailing edge portions $b$, $c$ is provided with internal cooling passages $d$, $e$ in such edge portions.

It will be seen that the core $a$ is generally of air foil configuration, and that portion $a1$ between the leading and trailing edge portions $b$ and $c$ is of less thickness than the leading and trailing edge portions immediately adjacent thereto. Spaced ribs $a2$ extend outwardly of the opposed surfaces of the portion $a1$, and sheet porous metal $f$ covers the external surfaces of the core between the leading and trailing edge portions. The porous metal sheet is attached to the spine or core by sintering, electric welding or other convenient means.

The spaced ribs $a2$ cooperate with the inner surface of the metal sheets $f$ to provide channels $g$ between the porous sheets and the central spine through which cooling medium may be supplied to cool the surface of the blade.

The air or other cooling medium in each channel may be metered according to the individual conditions of pressure and heat transfer existing on the external surface of the member at the various positions.

Figure 1:
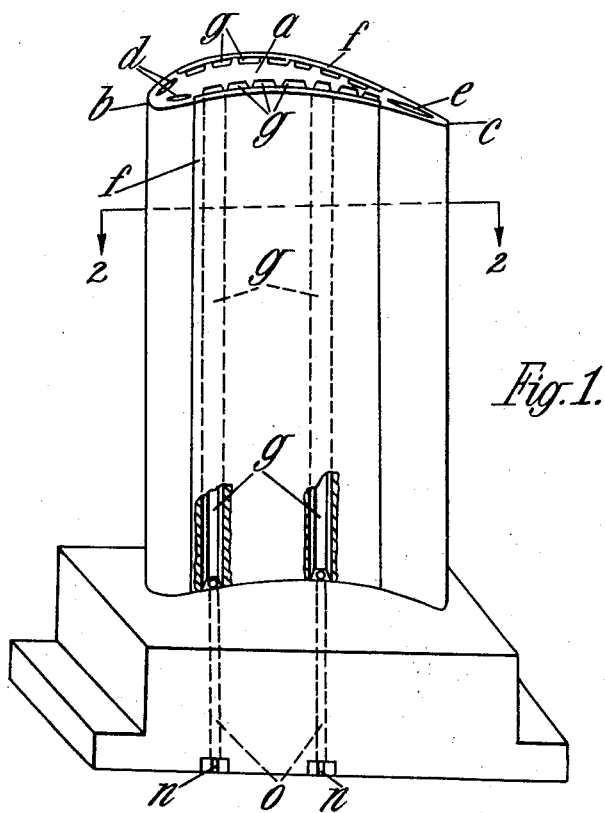
FIGURE 1 is a view in perspective, partly broken away and partly in cross-section, of one form of the invention.

An example of such arrangement is shown in FIGURE 1 in which orifices $n$ of different cross-sectional areas are provided in ducts $o$ leading to individual channels.

In an alternative arrangement shown in FIGURE 3 porous sheets $f$ of varying thickness are provided.

Figure 2:
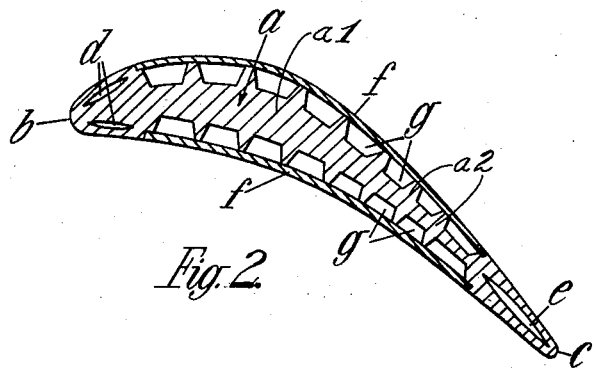
FIGURE 2 is a cross-sectional view taken along the line 2—2 of FIGURE 1, the view looking in the direction of the arrows and being on a slightly larger scale.

Instead of the sheets being of varying thickness, they may be of varying permeability of the porous material $f$. In the arrangements of FIGURES 2 and 3 separate channels are unnecessary as shown in FIGURE 6 unless required for mechanical strength.

If desired, coolant exhausted at the tip of a blade from the internal cooling passages $d$ and $e$ may be fed back into the cooling channels $g$ by means of a suitable plate located in the tip, thus effecting a further rise in temperature of the cooling air before it is discharged into the gas stream thereby reducing the overall coolant mass flow.

An example of such arrangement is shown in FIGURES 4 and 5 in which coolant at the outer end of the passages $d$ is caused to pass by passages $i$ and calibrated openings $h$ into adjacent channels $g$ and coolant from the passage $e$ is caused to enter the adjacent channels $g$ by way of openings $j$, $k$.

The channels $g$ convey coolant from the blade root to the porous sheet $f$ and plate $m$ through which it may percolate.

The main advantages that may be achieved by constructions embodying the present invention are as follows:

Adequate cooling of the leading edge portion under all gas flow conditions may be achieved.

The trailing edge portion of the blade or other member can be made thin to avoid high aerodynamic loss and still be effectively cooled.

The central spine integral with the leading and trailing edge portions provides a strong load carrying member whilst the strength of the porous material is of secondary importance.

The manufacture of a blade or other member is relatively simple.

The efficiency of the internal cooling at the leading and trailing edge portions may be increased by exhausting the air into some of the channels g to further cool the blade surface.

We claim:

1. In a member subject to a hot gas stream and having one end contituting a tip, a core having a body portion with opposed surfaces, leading and trailing edge portions integral with said body portion, the thickness of the body portion adjacent and rearwardly of the leading edge portion and adjacent and forwardly of the trailing edge portion being less than the respective thicknesses of the leading edge and trailing edge portions, spaced ribs integral with and extending outwardly of the opposed surfaces of the body portion, a covering of porous material over said opposed surfaces of the body portion, said covering extending between said leading edge portion and trailing edge portion from behind the leading edge portion to forwardly of the trailing edge portion and secured to the respective rear and forward ends of said portions and to said spaced ribs with the area between adjacent ribs and the overlying covering providing channels for receiving a coolant to cool the member by effusion, and said leading and trailing edge portions each having at least one passage therein respectively forwardly and rearwardly of said channels for receiving a coolant to cool said respective edge portions internally.

2. A member as claimed in claim 1, further including means to meter the supply of coolant to each channel in accordance with the individual conditions of pressure and heat transfer existing on the outer surface of the member at different parts thereon.

3. A member according to claim 2, further including a root for the member and said metering means being defined by metering orifices in the root communicating with each channel.

4. A member as claimed in claim 1, in which the thickness of said covering of porous material varies for different parts of the surface of the member.

5. A member as claimed in claim 1, in which the permeability of the covering of porous material varies for different parts of the surface of the member.

6. A member as claimed in claim 1, further including means adjacent the tip of the member for feeding coolant discharged from said passage in each of said leading and trailing edges to at least some of said channels.

7. A member as claimed in claim 6, in which a plate member covers said one end of the body member and constitutes the tip, and calibrated openings providing communication between the passages in the edge portions and said channels.

8. In a member subject to a hot gas stream, a core having a body portion and integral leading and trailing edge portions, the thickness of the body portion adjacent and rearwardly of the leading edge portion and adjacent and forwardly of trailing edge portion being less than the respective thicknesses of the leading edge portion and the trailing edge portion, a covering of porous material extending between said leading edge portion and trailing edge portion from behind the leading edge portion to forwardly of the trailing edge portion and secured to the respective rear and forward ends of said portions, with the area between the body portion, the edge portions, and the covering providing at least one channel for receiving a coolant to cool the member by effusion, and said leading and trailing edge portions each having at least one passage therein respectively forwardly and rearwardly of said one channel for receiving a coolant to cool said respective edge portions internally.

References Cited in the file of this patent

UNITED STATES PATENTS

| 2,774,566 | Richardson | Dec. 18, 1956 |

FOREIGN PATENTS

| 619,634 | Great Britain | Mar. 11, 1949 |
| 619,722 | Great Britain | Mar. 14, 1949 |
| 641,146 | Great Britain | Aug. 2, 1950 |
| 660,007 | Great Britain | Oct. 31, 1951 |
| 682,868 | Great Britain | Nov. 19, 1952 |
| 1,007,303 | France | Feb. 6, 1952 |
| 1,090,193 | France | Oct. 13, 1954 |